United States Patent [19]

Terauchi

[11] Patent Number: 4,512,224

[45] Date of Patent: Apr. 23, 1985

[54] SLITTER DEVICE

[75] Inventor: Isamu Terauchi, Osaka, Japan

[73] Assignee: Kabushiki Kaisha Kindai, Osaka, Japan

[21] Appl. No.: 481,077

[22] Filed: Mar. 31, 1983

[30] Foreign Application Priority Data

Apr. 1, 1982 [JP] Japan .............................. 57-47933[U]
Jul. 12, 1982 [JP] Japan .............................. 57-106110[U]

[51] Int. Cl.[3] .......................... B23B 7/00; B23B 25/04

[52] U.S. Cl. .......................................... 82/48; 82/100

[58] Field of Search .................... 82/48, 100; 408/5, 7; 409/134; 83/58; 144/251 R; 30/390; 192/129 A, 130, 144

[56] References Cited

U.S. PATENT DOCUMENTS 3,128,659 4/1964 Judelson ................................ 82/46
3,748,934 7/1973 Lezberg ................................. 82/48
3,785,230 1/1974 Lokey .................................... 83/58
3,861,253 1/1975 Witcraft et al. ........................ 82/48
3,933,063 1/1976 Stoffers .................................. 82/48
3,933,090 1/1976 Reynolds ................................ 82/48

*Primary Examiner*—Leonidas Vlachos
*Assistant Examiner*—Jerry Kearns
*Attorney, Agent, or Firm*—Koda and Androlia

[57] ABSTRACT

This disclosure relates to improvements in a slitter device which cuts a roll-shaped long piece rotatably supported almost horizontally by a guide holder rod into round slices with the predetermined width using a rotary cutting blade which moves back and forth perpendicular to the long piece, and more particularly to the safety control of the slitter device which immediately stops the rotation of the cutting blade or retracts the cutting blade from the guide holder rod or uses other methods when the rotary cutting blade contacts the guide holder rod.

5 Claims, 6 Drawing Figures

SLITTER DEVICE

BACKGROUND OF THE INVENTION

1. Field of the Invention

This invention relates to improvements in a slitter device which cuts a roll-shaped long piece rotatably supported almost horizontally by a guide holder rod into round slices with the predetermined width using a rotary cutting blade which moves back and forth perpendicular to the long piece, and more particularly to the safety control of the slitter device which immediately stops the rotation of the cutting blade or retracts the cutting blade from the guide holder rod in the preferred embodiments of the invention when the rotary cutting blade contacts the guide holder rod.

2. Prior Art

In the past, an emergency stop limit switch has been generally used for the slitter device which cuts a rotating roll-shaped long piece into round slices using a rotary cutting blade. When a return switch is defective and the cutting blade rotating at a high speed closely approaches the guide holder rod to the predetermined distance (usually 1.0 to 1.5 mm), the emergency stop limit switch is actuated to turn off the motor power supply for traversing the table and the motor power supply for rotating the cutting blade to prevent the cutting blade from contacting the guide holder rod. However, as the efficiency of cutting work increases, the rotating speed of the cutting blade becomes higher. Accordingly, in addition to the safety means for contact prevention using the limit switch, another safety control means has become demanded.

SUMMARY OF THE INVENTION

It is therefore the principal object of the present invention to provide a slitter device which can perform safety control. In the preferred embodiments of the present invention, when a cutting blade contacts the rod which guides and holds a workpiece and thus a current flows, the cutting blade immediately stops rotating or retracts from the guide holder rod so that the cutting edge does not scatter and can be reground for reuse and thus the guide holder rod is slightly scratched. In addition a second safety means is provided which stops the rotary blade when the rotary blade return switch is defective and the rotary blade approaches the guide rod to within a predetermined distance, preferably 1.0 to 0.5 mm. This objective will become more apparent when the preferred embodiments of the present invention are considered in connection with the drawings.

DETAILED DESCRIPTION OF THE INVENTION

Figure 1:
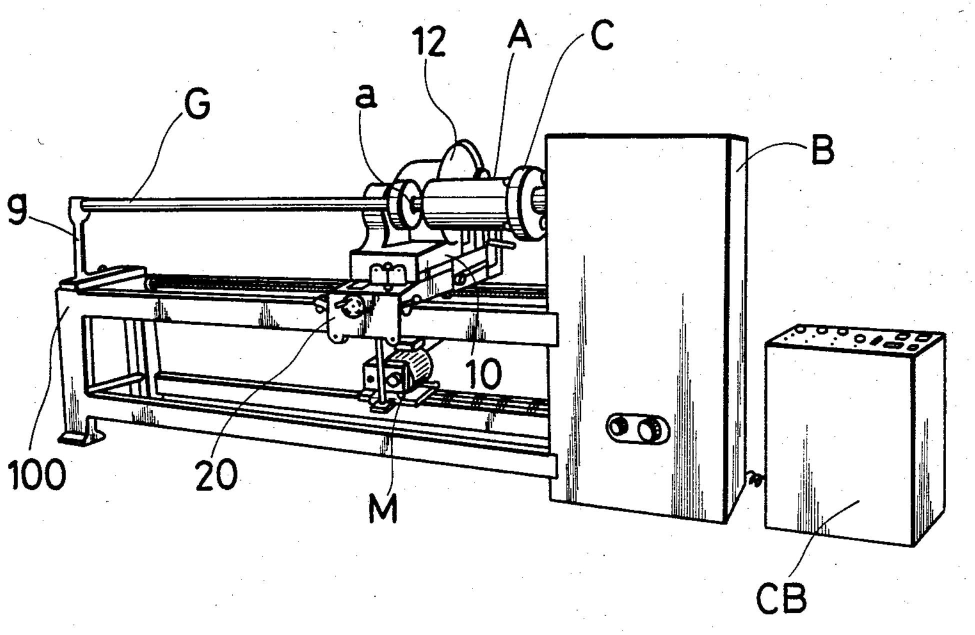
FIG. 1 is a perspective view showing an external appearance of the slitter device of the present invention.
Figure 2:
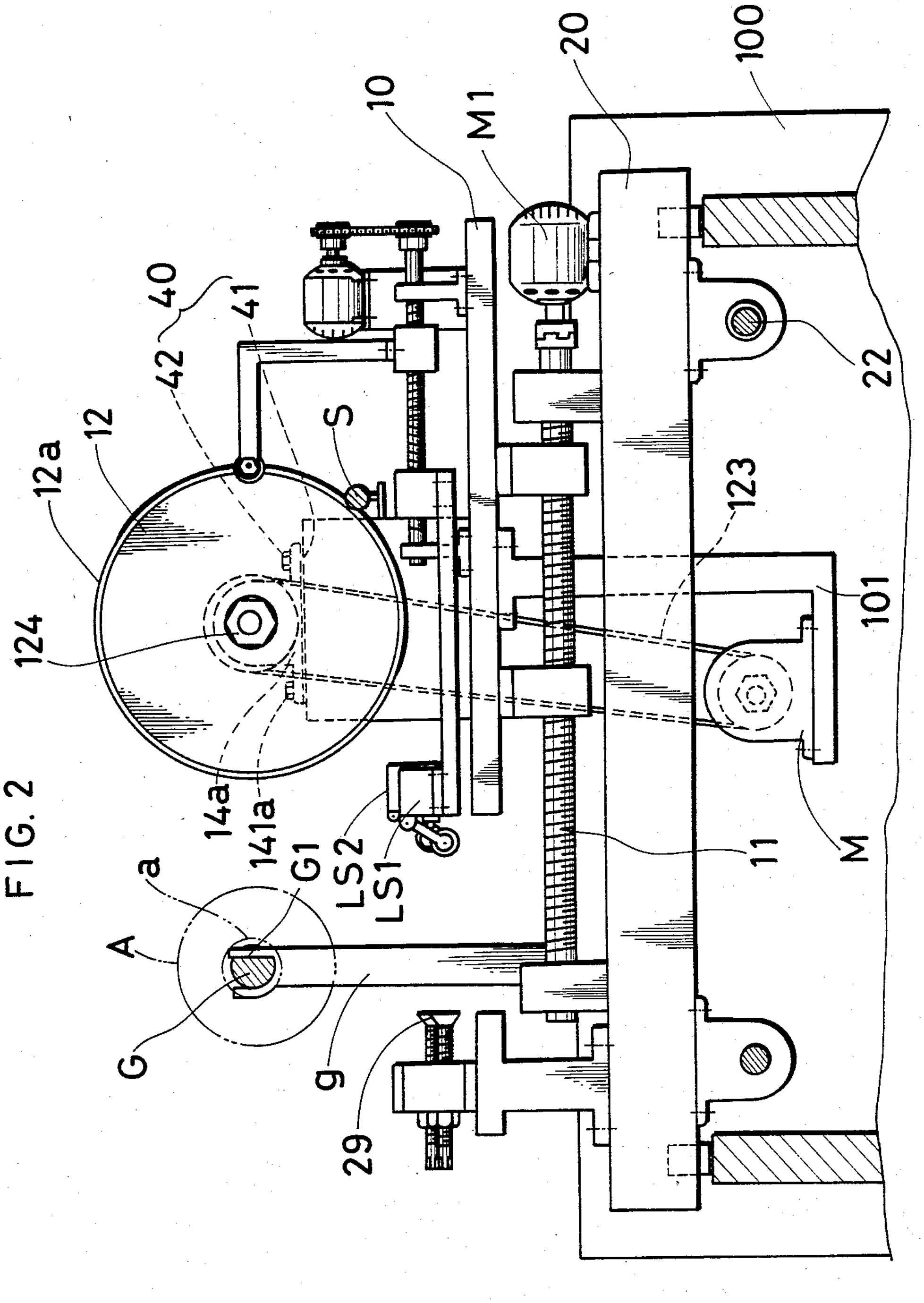
FIG. 2 is a sectional view used for explanation of the cutting blade drive unit and the transfer unit of the present invention.
Figure 3:
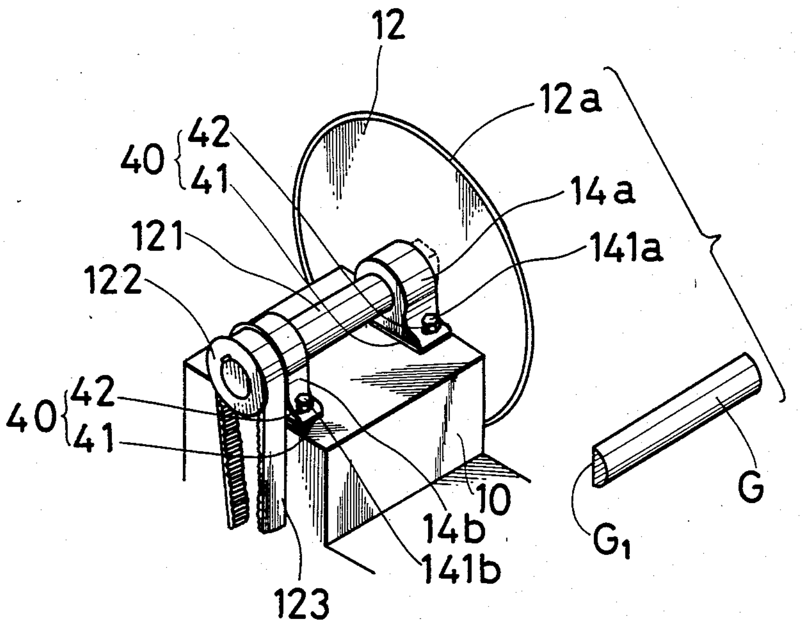
FIG. 3 is a perspective view showing the bearing section of the cutting blade drive shaft.

Referring to FIGS. 1, 2 and 3, a roll-shaped long piece A made of cotton cloth, etc. is rotatably supported in the almost horizontal direction by the metallic guide holder rod G which passes through the hole in the paper tube core "a" of the long piece A and installed on the machine base 100 using a stay g. The long piece A is held by a chuck C at its one end and rotated by the motor in the motor box B. The guide holder rod G is D-shaped and has a flat surface B1 corresponding to a chord. The rotating direction and speed of the long piece A are selected and determined according to the kind and condition of the piece A. A metallic round cutting blade 12 is removably secured by a nut 124 on the one end of the drive shaft 121, rotated by the motor M on the base seat 101 installed on the bottom surface of the traverse table 10, via the pulley 122 secured at the other end of the shaft 121 and the timing belt 123, and supported by the bearings 14*a* and 14*b* on the table 10. The table 10, mounted on the carriage 20 traversing in the longitudinal direction of the guide holder rod G, approaches the guide holder rod G via the ball screw 11 in the perpendicular direction to the bar G.

Figure 4:
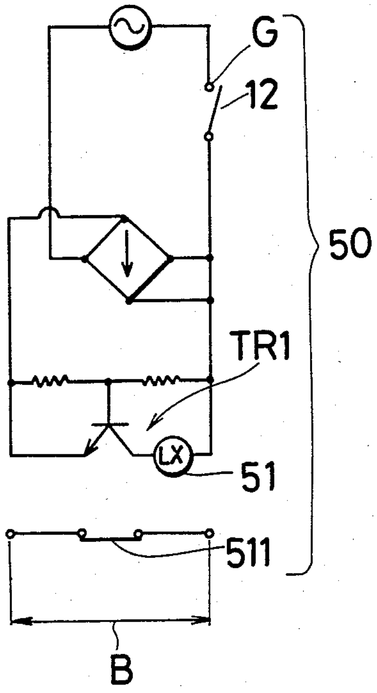
FIG. 4 is an electric circuit diagram for emergency stop.
Figure 5:
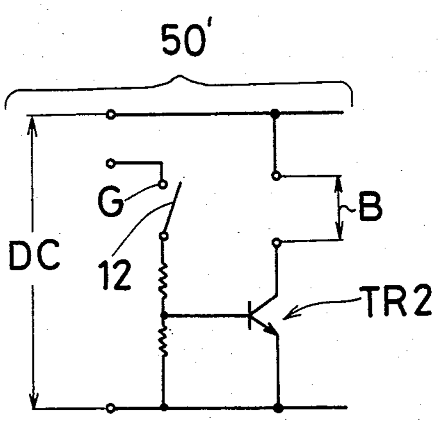
FIG. 5 is an application circuit diagram of the electric circuit diagram shown in FIG. 4.
Figure 6:
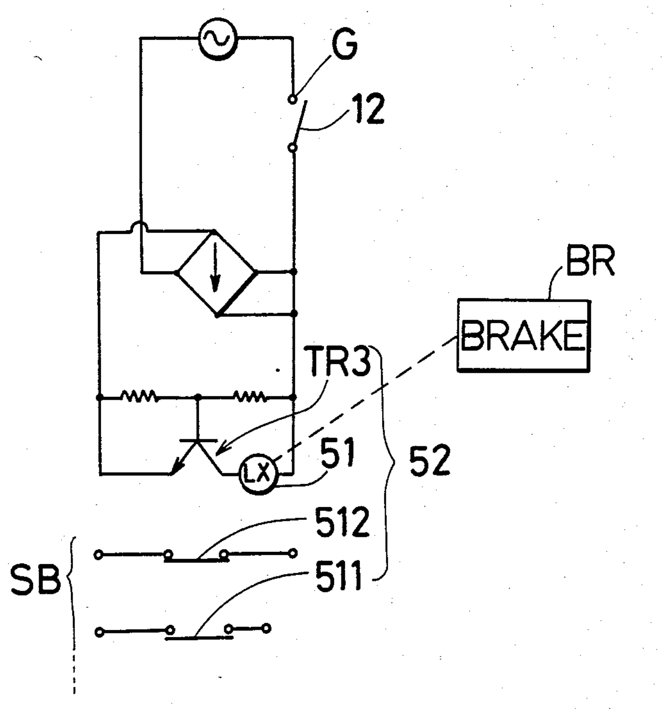
FIG. 6 is an electric circuit diagram for retracting the cutting blade.

When the edge 12*a* of the cutting blade 12 comes close to the flat surface G1 of the guide holder rod G to the predetermined length (approximately 8 mm), the return limit switch LS1 contacts the back-and-forth adjustable stopper screw 29 mounted on the carriage 20, then the table 10 returns. The flat surface G1 is provided so that the cutting edge 12*a* can deeply cut the core "a". Also, limit switch LS2 is provided to immediately stop the table 10 when said return limit switch LS1 is defective and the cutting edge 12*a* of the rotary blade 12 approaches the flat surface G1 of the guide support rod to within a distance of 1.0 to 1.5 mm. The carriage 20 carrying the table 10, is mounted on the machine base 100 so that it can traverse by inching according to the cutting width by the rotation of ball screw 22 in the longitudinal direction of the guide holder rod G. The control board CB is used to set cutting widths and quantity of the long piece A, to select automatic and manual operation modes and to control other functions. The slitter device constructed as described above can cut the roll-shaped long piece A into round slices with the predetermined width using the cutting blade 12 while the long piece A is rotated. According to the present invention, the bearings 14*a* and 14*b* rotatably supporting the cutting blade drive shaft 121 and supporting the cutting blade 12 at one end and the pulley at the other end are secured by the bolts 141*a* and 141*b* on the table 10 via a liner 41 made of electric insulator 40 such as bakelite and via washers 42 made of the same electric insulator placed under the heads of the bolts 141*a* and 141*b*. The timing belt 123 to drive the drive shaft 121 is made of an electric insulator such as rubber including cloth. Accordingly, the cutting blade 12 is electrically insulated from the guide holder rod G mounted on the machine base 100. An AC voltage of approximately 8 V is applied to the cutting blade through the bearing 14*a* when electric power is supplied to the slitter, and is used to detect accidental contact between the cutting blade 12 and the guide holder rod G. When a current flows between the cutting blade 12 and the guide holder rod G due to contact, the preferred embodiments of the present invention performs safety control using the current as a detection signal by immediately stopping the rotation of the cutting blade 12 or by retracting the cutting blade 12 from the guide holder rod G. In the former case, the control circuit shown in FIG. 4 is used as an example. In the circuit 50 in FIG. 4, the cutting blade 12 and the guide holder rod G function as a touch switch. When they contact each other, a current flows. This current is amplified by the transistor TR1 in the control circuit 50 and actuates the relay 51. In other words, when the relay 51 is energized, it opens the contact 511 of the motor M drive circuit of the sequencer circuit B included in the control board CB. As a result, electric power is cut off and the cutting blade 12 is stopped. Instead of this circuit, a control circuit without using a relay can also be used. With this circuit, the switching transistor TR2 is actuated when power is supplied and opens the motor M drive circuit in the sequencer circuit B in the same manner as described above. This control circuit 50' can be used instead of the circuit 50 in FIG. 4 when required. After the contact between the cutting blade 12 and the guide holder rod G is detected, the control circuit shown in FIG. 6 functions to reversely rotate the ball screw 11 and to retract the table 10. In FIG. 6, the current flowing between the cutting blade 12 and the guide holder rod G due to contact is amplified by the transistor TR3 in the control circuit 52 and actuates the relay 51. When the relay 51 is energized, it opens the contact 511 in the control circuit, which controls to rotate the ball screw driving motor M1 in the approaching direction, in the sequencer circuit SB included in the control board CB. At the same time, the relay 51 actuates the brake BR for the motor M1 and closes the contact 512 in the control circuit, which controls to rotate the driving motor M1 in the retracting direction. As a result, the motor M1 rotates in the reverse direction to retract the cutting blade 12.

By appropriately combining the function of the cutting blade rotation stop type embodiment and the function of the rotation continuation and retraction type embodiment, it is obvious that an embodiment which stops the rotation of the cutting blade and simultaneously retracts the cutting blade can easily be made using circuit technology.

In addition to stopping of the cutting blade, application of an electromagnetic brake is preferable to stop the rotation of the cutting blade due to inertia. With the slitter device of the present invention, an emergency stop limit switch LS2 is set to be actuated when the cutting blade 12 approaches the flat surface G1 of the guide holder rod G even if the return limit switch LS1 is defective, the cutting edge 12*a* of the cutting blade 12 does not scatter but is reground by the grinder S for reuse. Therefore, immediately after the guide holder rod G is slightly scratched, the cutting blade can be stopped positively or the cutting blade can be retracted while it is rotating or after it is stopped. As a result, operator's safety is ensured and the slitter can be maintained conveniently.

The slitter device of the present invention is significant when it is independently used or when it is used in combination with the known contact stop safety means which stops the cutting blade and the traverse table when the cutting blade approaches the guide holder rod.

I claim:

1. A slitter device for an elongated roll shaped workpiece having a hollow core comprising: a base, an electrically conductive guide holder support rod having a D shaped transverse cross-section on said base for insertion into the hollow core of a workpiece, means on said base to rotatably drive a workpiece, a longitudinally movable carriage on said base, a transversely movable table on said carriage, a feed motor for moving said table, a bearing, bolts mounting the bearing on said table, a drive shaft rotatably supported by said bearing, a cutting blade fixed for rotation with said shaft, a cutter drive motor and means drivingly connecting said cutter drive motor to said drive shaft, first control means for limiting the movement of said table toward said support rod to prevent contact between said cutting blade and said support rod, safety means operable in the event of failure of said first control means comprising: a brake means coupled to said cutting blade drive motor for stopping the rotation of said cutting blade drive motor and to stop rotation of said cutting blade, an electrical insulating means provided between said cutting blade and said guide holder support rod for providing electrical insulation between said cutting blade and said rod during non-contact of the two, said insulating means comprising an insulating liner placed between said bearing and said table, insulating washers placed under the heads of said bearing mounting bolts, a belt made from an electrical insulating material coupling said cutter drive motor to said drive shaft, a control circuit which applies an electric voltage between said cutting blade and said support rod and which controls said cutting blade drive motor, said table feed motor and said brake when said cutting blade accidentally contacts said support rod and an electric current flows between said cutting blade and said support rod to stop the rotation of and retract said cutting blade, said control circuit means comprising a first switching means which interrupts current flow to said cutting blade drive motor in response to current flow between said cutting blade and said guide holder support rod and a second switching means which reverses the direction of rotation of said feeding motor in response to current flow between said cutting blade and said guide holder support rod to simultaneously stop and retract said cutting blade from said guide holder rod.

2. A slitter device as claimed in claim 1, wherein said first switching means includes a relay, which is actuated by a current generated when said cutting blade contacts said guide holder rod, to open the drive circuit of said cutting blade drive motor.

3. A slitter device as claimed in claim 1, wherein said first switching means includes a switching transistor, which is actuated by a current generated when said cutting blade contacts said guide holder rod, to open the drive circuit of said cutting blade drive motor.

4. A slitter device as claimed in claim 1, wherein said second switching means includes a relay, which is actuated by a current generated when said cutting blade contacts said guide holder rod, which reverses the direction of rotation of said feeding motor to retract said cutting blade from said guide holder rod.

5. A slitter device as claimed in claim 4, wherein said relay opens a circuit which is used to advance said cutting blade to said guide holder rod and closes a circuit which is used to retract said cutting blade from said guide holder rod.

* * * * *